United States Patent Office 3,498,754
Patented Mar. 3, 1970

3,498,754
CONTINUOUS POLYCONDENSATION
APPARATUS
Toyotsugu Yamashita, Seiji Uno, Shozo Suzuki, Itaru Nakamura, and Nobuo Sakaiya, Matsuyama-shi, Ehime-ken, Japan, assignors to Teijin Limited, Umeda, Kita-ku, Osaka, Japan, a corporation of Japan
Filed Dec. 17, 1965, Ser. No. 514,600
Claims priority, application Japan, Dec. 24, 1964, 39/73,163
Int. Cl. C08g 17/003; B01d 19/00; B01f 7/00
U.S. Cl. 23—285                                     1 Claim

ABSTRACT OF THE DISCLOSURE

An improved apparatus for continuously preparing highly viscous polymers by continuously effecting a polycondensation reaction, such improvement residing in the following (1) providing radially on at least one shaft within the apparatus agitating vanes which are adapted to impart a forward movement to the molten reactant in the reaction compartments, (2) providing overflow openings in each of the partitions of the apparatus in a position forward of said agitating vanes for causing the overflow and passing of the molten reactant through said openings, (3) the disposition of said openings being such that their lowest level is higher than that of shafts and the highest level attained by the tips of the said agitating vanes is located between the upper level of said partitions and the lowest level of said openings, (4) a major part of each of said several rotative agitating vanes being always located below the level of the reactant.

Figure 1:
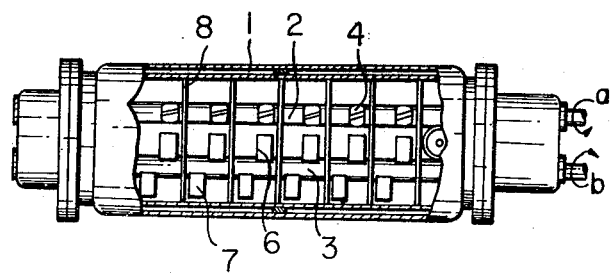

Such improved apparatus allows for a reduction in the fluctuation of the residence time of the reactants in each of the reactant compartments and provides for an improved flow of the reactant and product through the apparatus.

---

This invention relates to a reaction apparatus which continuously produces synthetic linear polymers by means of the polycondensation reaction. More particularly, the invention relates to a reaction apparatus which continuously produces from the intermediate polymers of condensable substances such as polyesters, polyamides and polycarbonates, high polymers having fiber and film-forming ability by means of the elevated temperature polymerization.

Generally speaking, this type of reaction apparatus is required (1) to transfer the molten reactant gradually from the feed port to the take-out port, if possible, in a state resembling that of piston flow; (2) to provide the reactant with a fixed average residence time; and (3) to take out effectively the volatile matter which is generated during the reaction. However, since the reactant becomes a viscous and hard-to-handle substance as the degree of polymerization rises with the progress of the reaction, it is a difficult matter to satisfy the foregoing three requirements at the same time.

In the past, the principal measure taken to satisfy the first requirement was to provide a plurality of reaction compartments; that for meeting the second requirement was the provision of overflow dams; and that to satisfy the third requirement was to accelerate the agitation of the reactant as well as to increase to a maximum the surface area of the reactant. However, in recent years a demand has arisen for polymers of much higher degree of polymerization than heretofore for such uses as industrial textiles. The handling of these highly viscous materials has become increasingly more difficult, but there are none among the apparatuses known to date which are serviceable for these highly viscous materials.

Namely, it is usually a difficult matter to stir such highly viscous materials as these, it being necessary to conceive of this as kneading rather than stirring. Further, since the rate at which these materials flow by gravity is extremely slow, there is a need to transfer them forcibly by mechanical force. However, sufficient consideration has not been given to this point in the prior art apparatuses. It is also an advantage from the production standpoint that high polymers such as these be directly extruded from a spinneret and made into the final product without making them into chips first. This is for precluding the decomposition of these high polymers by heat. In this case, it is necessary however that the timewise variation of grade of the polymers be minimized. For this purpose, all of the reaction conditions have to be stabilized. In the previously proposed apparatuses, there was however the tendency of the highly viscous reaction product to stick to the shaft and agitating vanes of the agitating means, with the consequence that it was extremely difficult to maintain stably the residence time of the reactant constant.

We have now discovered that polymers of higher degree of polymerization than heretofore could be continuously prepared very stably by employing an apparatus according to the present invention wherein in an apparatus for continuously preparing highly viscous polymers by carrying out continuously a polycondensation reaction with the generation of volatile matter, which comprises a horizontal reaction vessel having a plurality of reaction compartments adjacently disposed in line, the separation of which is done by means of at least two partitions which extend upwardly substantially vertically from the bottom of said reaction vessel to a predetermined level below the top of said vessel, and a single common space of said reaction compartments which is disposed above said partitions, at least two rotative agitating means having substantially horizontal shafts passing through said reaction compartments, means for feeding the starting reactant to the first reaction compartment, means for taking out the reaction product from said reaction vessel, means for removing from the reaction vessel the volatile matter which is generated during the reaction, and means for maintaining the interior of the reaction vessel with a temperature, pressure and atmosphere suitable for the reaction, (1) agitating vanes, which are adapted to impart a forward movement to the molten reactant in the reaction compartments, are provided radially on at least one of said shafts, (2) overflow openings are provided in each of the partitions in a position forward of said agitating vanes for causing the overflow and passing the reaction through said openings, (3) wherein the disposition of said openings is such that their lowest level is higher than that of the shafts and the highest point which the tips of said agitating vanes attain during their rotation is a point between the upper level of said partitions and the lowest level of said openings, and (4) wherein a major part of said rotative agitating vanes is normally located below the level of the reactants.

It is an advantage for the reaction vessel of this invention to be of cylindrical shape disposed horizontally. Although the number of agitating shafts in normally two, three or more may be employed for increasing the surface area of the reactants. The speed at which the shafts are rotated cannot be made too fast for preventing the generation of heat resulting from the shearing of the highly viscous material. It ranges between several to several tens of rotations per minute. The direction of rotation is optional, it being decided so that an effective kneading action is obtained in consideration of the shape of the agitating vanes. The agitating vanes are fitted radially to the shaft along practically its whole length.

It is not necessary however that a single vane be provided to each shaft in each of the reaction compartments. The shape of the agitating vanes may be either boardlike, screwlike or one having a winglike section, but it is not desirable for it to be of complicated shape as to become the cause for creation of dead spaces. The clearance between the vanes and the wall is preferably small, but for preventing the generation of heat as a result of shearing the usual clearance is from several millimeters to several tens of millimeters. The distance between the shafts can be either such that the circumferences described by the vanes nearly meet each other or that they cross each other without the vanes colliding with the neighboring shaft. When the vanes cross each other, it is, of course, necessary to ensure that the vanes do not collide with each other by appropriately deciding as to the disposition and rotation speed of the vanes and their direction of rotation.

Thus, by employing in this manner at least two agitating means consisting of agitating shafts and vanes, it is a well known fact that rather being a disadvantage the sticking and mutual actions of a highly viscous material can be used to advantage to carry out the kneading operation satisfactorily. To cause the reactant to make a forward movement axially of a shaft, this can be achieved by providing twists and slopes to the vanes fitted to the shaft, thus imparting a screw or propeller action to the vanes. It is not particularly necessary to provide the other shaft with a transferring action, but it is possible to create a circulating flow in the reaction compartments by imparting to it a transferring action in the opposite direction.

According to the present invention, overflow openings are provided in the partitions forward of the shaft of the agitating means which imparts an advancing action to the reaction melt. The lowest level of these openings is located higher than the shaft of the agitating means, while the highest point which the tips of the vanes attain during their rotation is made to be between the upper level of the aforementioned partitions and the lowest level of the aforementioned openings. In operating the invention apparatus, the level of the molten reactant in the reaction compartment is maintained at the lowest level of the foregoing openings, or a level slightly lower when the agitation is stopped, and a major part (i.e. at least a half) of the agitating vanes are normally immersed in the molten reactant during their rotation. Hence, in the operation wherein the invention apparatus is used only that part of the reactant which has been lifted higher than the overflow openings by means of the agitating vanes are extruded forcibly through the openings by the advancing action. Moreover, since not only the movement of the other unstable overflow is prevented by the partitions but also the fluctuation in the amount of the reactant sticking to the agitating vanes due to viscosity is small, the amount of the reactant in the reaction compartments can be maintained constant at all times. Therefore the invention reaction apparatus constitutes a cascade tank containing a constant quantity of the reactant. Thus when a constant quantity of the intermediate polymer is fed from the feed port provided at one end of the reaction vessel for the starting reaction material, and the reaction compartments are maintained at a temperature, pressure and atmosphere suitable for the reaction, high polymers of stable quality can be taken out from the other end of the reaction vessel. In taking out the high polymer a screw extruder or other types of pumps for use with highly viscous material are employed. As the heating of the reaction vessel must be carried out uniformly, jacket heating with a heating medium is preferred. Although the reaction temperature will vary in accordance with the material handled, it usually ranges between 200° and 350° C. The pressure inside the reaction vessel is maintained under an atmosphere of an inert gas, say, $N_2$ gas at a vacuum of several millimeters of mercury when the reactants are either polyester or polycarbonates and at normal atmospheric or reduced pressure when the reactants are polyamides.

Figure 2:
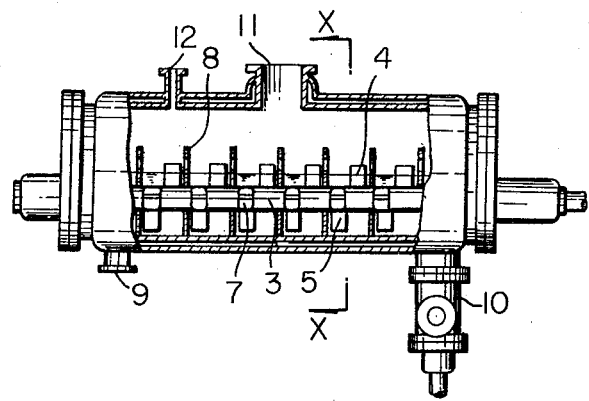
Figure 3:
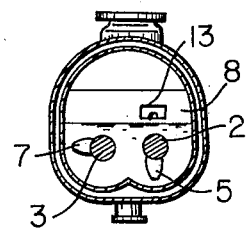

One embodiment of the apparatus according to the present invention is illustrated with reference being had to the accompanying drawings, wherein:

FIGURE 1 is a plan view partly broken away to illustrate the invention apparatus; FIGURE 2 being a side view thereof partly broken away; FIGURE 3 being a view in vertical section taken along line X—X of FIGURE 2.

In FIGURES 1, 2 and 3, 1 is a reaction vessel equipped with a heating jacket, 2 and 3 are agitating shafts, 4, 5, 6 and 7 are agitating vanes and 8 is a partition. The shafts 2 and 3 are rotated in the directions of arrows $a$ and $b$ at a speed ratio of 3:2. The agitation vane 4 is inclined to the shaft about 15 degrees, but the other vanes 5, 6 and 7 are not inclined. The reactant which has been polycondensed to an intermediate degree of polymerization in the reaction apparatus of the preceding stage is fed at a controlled rate from a pipe 9 and enters the first reaction compartment. Since the four vanes in each of the reaction compartments make complicated interacting movements, the reactant is uniformly mixed and the creation of dead spaces is prevented. The liquid surface of the reactant becomes a complex curved surface and since a fresh surface is being constantly formed, the separation of the volatile matter is accelerated. A part of the reactant upon being lifted by the vane 4 is advanced from an overflow opening 13 to enter the next reaction compartment. A total of eight reaction compartments are provided. In order that the liquid level of the reactant can be measured, the eighth compartment is not provided with any agitating vanes. A screw pump 10 is installed at the bottom of the eighth compartment, and the reaction product is taken out at a prescribed rate of flow by this pump. A pipe 11 is for removing the volatile matter, while a pipe 12 is provided for the purpose of introducing the inert gas as well as for use in determining the pressure inside the reaction vessel.

The following example will be given to illustrate the instance where the hereinabove described apparatus is employed and polyethylene terephthalate of high degree of polymerization is prepared. The invention however is not to be limited thereby. The intrinsic viscosity in the examples were measured in orthachlorophenol at 35° C. The percentages used are on weight basis.

EXAMPLE

An intermediate polymer of polyethylene terephthalate having an intrinsic viscosity of 0.65 and containing 0.045% of antimony trioxide as catalyst was fed at the rate of 40 kg. per hour to the apparatus shown in the drawings. The temperature inside the reaction compartments was maintained at 285° C. by means of the heating jacket, and the pressure was maintained at a vacuum of 0.5 mm. Hg. The rotation of the shaft 2 was 12 r.p.m. After an average residence time of about two hours, a polymer having an intrinsic viscosity of 0.85 and a melt viscosity of 15,000 poises was continuously taken out. When this was immediately introduced to a spinning apparatus and spun, a fiber suitable for the production of industrial textiles was obtained.

While the apparatus of this invention is especially united to the preparation of high polymers having a melt viscosity of above 4000 poises, it is also employed to advantage in preparing polymers having melt viscosities lower than the foregoing value in that homogeneous reaction products can be obtained owing to the stability of the residence time.

We claim:

1. In an apparatus for continuously preparing highly viscous polymers by continuously effecting a polycondensation reaction with the generation of volatile matter, said apparatus comprising a horizontal reaction vessel having a plurality of reaction compartments adjacently disposed in line, the separation of which is done by means of at least two partitions which extend upwardly substantially vertically from the bottom of said reaction vessel to a predetermined level below the top of said vessel and a single common space of said reaction compartments which is disposed above said partitions, at least two rotative agitating means having substantially horizontal shafts passing through said reaction compartments, means for feeding the starting reactant to the first reaction compartment outlet means for taking out the reaction product from said reaction vessel, means for removing from the reaction vessel the volatile matter which generates during the reaction, and means for maintaining the interior of the reaction vessel with a temperature, pressure and atmosphere suitable for the reaction; the improvement which consists of (1) overflow openings in each of said partitions in a position forward of said agitating means, said agitating means causing the overflow and passing of the molten reactant through said openings, the disposition of said openings being such that their lowest level is higher than that of said shafts and the highest level attained by the tips of the said agitating means is located between the upper level of said partitions and the lowest level of said openings, the lowest level of said openings becoming gradually lower toward the outlet of said vessel, and (2) at least one paddle type vane radially on each of said shafts of said agitation means in a manner such that said vanes facing said overflow openings are inclined to said shafts for causing the forward movement of the viscous liquid, a major part of each of said several rotative agitating vanes being located below the level of the molten reactant.

References Cited
UNITED STATES PATENTS 2,964,391  12/1960  Benson _____ 23—285
2,630,302   3/1953  Jones _____ 23—285 XR JAMES H. TAYMAN, JR., Primary Examiner U.S. Cl. X.R.

18—2; 259—6, 21, 64, 104; 260—75